United States Patent
Pfluger

(10) Patent No.: US 11,609,129 B2
(45) Date of Patent: Mar. 21, 2023

(54) WEIGH-IN-MOTION FORCE TRANSDUCER AND HOUSING PROFILE FOR SUCH W-I-M FORCE TRANSDUCER

(71) Applicant: Kistler Holding AG, Winterthur (CH)

(72) Inventor: Kim Pfluger, Winterthur (CH)

(73) Assignee: Kistler Holding AG, Winterthur (CH)

( * ) Notice: Subject to any disclaimer, the term of this patent is extended or adjusted under 35 U.S.C. 154(b) by 138 days.

(21) Appl. No.: 17/116,051

(22) Filed: Dec. 9, 2020

(65) Prior Publication Data
US 2021/0181040 A1 Jun. 17, 2021

(30) Foreign Application Priority Data
Dec. 16, 2019 (EP) .................................... 19216564

(51) Int. Cl.
*G01L 1/16* (2006.01)
*G01L 5/00* (2006.01)

(52) U.S. Cl.
CPC .............. *G01L 1/16* (2013.01); *G01L 5/0052* (2013.01)

(58) Field of Classification Search
CPC ........... G01G 3/13; G01G 19/021–024; G01G 19/04; G01G 19/03; G01L 1/16; G08G 1/02
See application file for complete search history.

(56) References Cited

U.S. PATENT DOCUMENTS

| | | | | |
|---|---|---|---|---|
| 4,712,423 A | * | 12/1987 | Siffert .................. | G01L 1/16 73/146 |
| 5,206,642 A | * | 4/1993 | Gregoire ................ | H01B 7/16 340/941 |
| 5,265,481 A | * | 11/1993 | Sonderegger ............ | G01G 3/13 177/21 OC |

(Continued)

FOREIGN PATENT DOCUMENTS

| | | |
|---|---|---|
| CN | 102928005 B | 10/2015 |
| CN | 205620011 U | 10/2016 |

(Continued)

OTHER PUBLICATIONS

European Search Report Translation, 2 pages.

(Continued)

*Primary Examiner* — Tran M. Tran
(74) *Attorney, Agent, or Firm* — Dority & Manning, P.A.

(57) ABSTRACT

A Weigh-In-Motion force transducer includes a housing profile and a piezoelectric measuring arrangement that generates electric polarization charges from a reaction force acting along a force introduction axis via the housing profile, which includes a tubular part internally defining a cavity containing the piezoelectric measuring arrangement under mechanical prestress along the force introduction axis. The tubular par is configured to be expanded along the force introduction axis by a mounting force acting along a mounting force axis and applied to the tubular part. The configuration of the tubular part in a cross-sectional plane defined (Continued)

by the force introduction axis and the mounting force axis is elliptical in shape with a major semiaxis extending along the mounting force axis and a minor semiaxis extending along the force introduction axis.

16 Claims, 6 Drawing Sheets

(56) References Cited

U.S. PATENT DOCUMENTS

| | | | | |
|---|---|---|---|---|
| 5,337,461 | A * | 8/1994 | Falcus | G10K 9/121 29/25.35 |
| 5,461,924 | A | 10/1995 | Calderara et al. | |
| 5,501,111 | A * | 3/1996 | Sonderegger | G01G 19/024 29/25.35 |
| 5,706,254 | A * | 1/1998 | Stahl | H04R 15/00 367/176 |
| 5,768,216 | A * | 6/1998 | Obata | G10K 9/121 367/172 |
| 5,926,439 | A * | 7/1999 | Piquette | G10K 9/121 367/161 |
| 5,942,681 | A * | 8/1999 | Vollenweider | G01L 17/005 73/146 |
| 6,301,544 | B1 * | 10/2001 | Sonderegger | B60C 23/06 340/940 |
| 6,595,064 | B2 * | 7/2003 | Drewes | G01L 9/0075 73/718 |
| 6,643,222 | B2 * | 11/2003 | Osborn | H04R 17/00 367/141 |
| D684,075 | S * | 6/2013 | Cornu | D10/94 |
| D686,928 | S * | 7/2013 | Cornu | D10/94 |
| 9,304,032 | B2 * | 4/2016 | Cornu | G01G 19/024 |
| 9,347,816 | B2 * | 5/2016 | Cornu | G01G 19/02 |
| 9,804,017 | B2 * | 10/2017 | Cornu | G01G 19/02 |
| 10,006,799 | B2 * | 6/2018 | Hanson | G01L 1/06 |
| 10,378,974 | B2 * | 8/2019 | Pfluger | G01L 1/16 |
| 10,640,936 | B2 * | 5/2020 | Simons | G01G 19/03 |
| 10,782,178 | B2 * | 9/2020 | Pedrick | G01G 19/03 |
| 10,809,120 | B2 * | 10/2020 | Minkoley | G01G 3/13 |
| 10,876,884 | B2 * | 12/2020 | Hanson | G01G 7/06 |
| 10,921,176 | B2 * | 2/2021 | Ribi | G01L 1/04 |
| 2013/0220709 | A1 * | 8/2013 | Trakhimovich | G01G 19/024 177/134 |
| 2014/0251700 | A1 | 9/2014 | Cornu et al. | |
| 2014/0345955 | A1 * | 11/2014 | Cornu | G01G 3/13 177/180 |
| 2015/0075297 | A1 * | 3/2015 | Cornu | G01G 19/024 73/862.642 |
| 2019/0285460 | A1 * | 9/2019 | Ribi | G01G 19/07 |
| 2020/0096382 | A1 * | 3/2020 | Pfluger | G01L 1/16 |
| 2021/0181010 | A1 * | 6/2021 | Schneider | G01G 19/024 |

FOREIGN PATENT DOCUMENTS

| | | |
|---|---|---|
| EP | 0654654 A1 | 5/1994 |
| JP | H-09201732 A | 8/1997 |
| JP | 3101637 B2 | 10/2000 |
| JP | 2019-158886 A | 9/2019 |
| WO | WO87/05773 A1 | 9/1987 |

OTHER PUBLICATIONS

Korean Patent Office OA with translation, Jan. 24, 2022, 7 pages.
Translation of Japanese Patent Office OA, Match 8, 2021, 4 pages.

* cited by examiner

WEIGH-IN-MOTION FORCE TRANSDUCER AND HOUSING PROFILE FOR SUCH W-I-M FORCE TRANSDUCER

TECHNICAL FIELD

The present invention relates to a WIM force transducer according to the preamble of the independent claim. The invention also relates to a housing profile for such a WIM force transducer.

BACKGROUND

Force transducers are commonly known. A force to be measured acts onto the force transducer and the force transducer generates a measurement signal under the action of this force.

More particularly, force transducers are known in the form of Weigh-In-Motion (WIM) force transducers. Such WIM force transducer is installed in a roadway and measures a reaction force of a vehicle traveling on the roadway when it crosses the WIM force transducer. The applicant is the market leader for WIM force transducers in which a piezoelectric measuring arrangement generates measuring signals in the form of electric polarization charges under the impact of the reaction force. The electric polarization charges are received by electrodes. The number of electric polarization charges is proportional to the amount of the reaction force. The measurement of the reaction force is dynamic, i.e. it is measured at a speed of the vehicle ranging from 2 km/h up to 200 km/h and more. It is possible to determine a wide range of traffic information from the measurement signals such as an axle load, a total weight, center distances, a vehicle length, a vehicle speed, etc.

Applicant's commonly owned U.S. Pat. No. 5,461,924 (hereafter Calderara et al), which is hereby incorporated herein by this reference for all purposes, discloses such WIM force transducer. The WIM force transducer comprises a housing profile including a force introduction flange, a tubular part and a force anchoring flange. A piezoelectric measuring arrangement is arranged in a cavity within the tubular part. The roadway extends along a horizontal axis. The force introduction flange is arranged at a distance of a few cm below the roadway surface. The reaction force to be measured is guided along a vertical axis via the housing profile onto the piezoelectric measuring arrangement. The vertical axis is also called the force introduction axis. The WIM force transducer is permanently mechanically secured in a subsurface of the roadway by means of the force anchoring flange.

The tubular part comprises walls. The walls protect the piezoelectric measuring arrangement from harmful environmental conditions such as soiling, dust and moisture.

The tubular part comprises two mounting members. The mounting members are integrally fabricated with the walls. The mounting members delimit a cavity for accommodating the piezoelectric measuring arrangement in the interior of the tubular part.

Furthermore, the mounting members hold the piezoelectric measuring arrangement under mechanical prestress within the cavity. Because of this mechanical prestress the surfaces of the piezoelectric measuring elements and the electrodes of the piezoelectric measuring arrangement rest one on top of the other in a force-locking manner to eliminate areas that are not in electrical contact with each other and partial charge tapping and to seal roughness and unevenness on these surfaces resulting in high measurement repeatability and linearity of the WIM force transducer. Measurement repeatability relates to the accuracy by which a measurement can be repeated under identical conditions. Linearity indicates how uniformly the number of electric polarization charges increases with increasing reaction force.

For generating the mechanical prestress a size of the piezoelectric measuring arrangement in the direction of the force introduction axis is provided with a certain oversize with respect to a size of the cavity. For mounting the piezoelectric measuring arrangement in the cavity, the tubular part is expanded elastically in the direction of the force introduction axis by means of a mounting force acting in the horizontal direction. The horizontal axis is also referred to as the mounting force axis. The mounting force is released after the piezoelectric measuring arrangement is mounted in the cavity. Thus, the elastic expansion of the tubular part along the force introduction axis is partially reversed and, due to the oversize, the mechanical prestress now acts in the direction of the force introduction axis.

According to the teaching of Calderara et al, the tubular part has a circular shape in a cross-sectional plane defined by the force introduction axis and the mounting force axis and the walls are of uniform wall thickness.

It has been found that the dimension of the cavity between the mounting members must be manufactured with high precision. This requires maintaining strict manufacturing tolerances, which imposes added costs on the manufacture. The force introducing surfaces of the force introduction flange must be held to a manufacturing tolerance of evenness and parallelism of less than 0.03 mm. The inner surface of each of the mounting members that delimits the cavity and holds the piezoelectric measuring elements must be held to a manufacturing tolerance of evenness and parallelism of less than 0.02 mm. With too much oversize a greater mounting force must be applied for expanding the tubular part which entails the risk of a partially plastic expansion of the tubular part during assembly. A tubular part undergoing partial plastic expansion will assume an unpredictable shape when the mounting force is released so that the mechanical prestress prevailing will be too low. In addition, if the oversize is not great enough the mechanical prestress acting after the mounting force is released will be too low.

In this regard, document CN102928005A1 teaches a WIM force transducer, a tubular part comprising walls having a wall thickness that increases constantly with increasing distance from the mounting members. At two mounting points where the mounting force acts onto the walls along the mounting force axis, the walls have the greatest wall thickness. The wall thickness from the mounting members to the mounting points increases in a cosinusoidal manner. This results in a massive, diamond-shaped tubular part.

To obtain the highest possible sensitivity of the WIM force transducer, the piezoelectric measuring arrangement is to be arranged in the main force path. The sensitivity is a ratio of the number of electric polarization charges and the magnitude of the reaction force. In the main force path, the highest possible proportion of the reaction force is transferred on the piezoelectric measuring arrangement via the housing profile. The massive, diamond-shaped tubular part according to the teaching of document CN102928005A1 reduces the sensitivity of the WIM force transducer.

OBJECTS AND SUMMARY OF THE INVENTION

It is a first object of the present invention to provide a WIM force transducer that generates measurement signals with high measurement repeatability and high linearity. A second object of the invention is to provide a very sensitive WIM force transducer. Furthermore, the third object is to provide the cost-effective manufacture of a housing profile for such WIM force transducer.

Other objects will become evident from the description that follows, and at least one of these objects has been achieved by the features described below.

The invention relates to a WIM force transducer comprising a housing profile and a piezoelectric measuring arrangement; said piezoelectric measuring arrangement generating electric polarization charges under the impact of a reaction force to be measured; said housing profile comprising a tubular part and a cavity in the interior of the tubular part; wherein said reaction force acts on the piezoelectric measuring arrangement via the housing profile along a force introduction axis; said piezoelectric measuring arrangement being mounted under mechanical prestress in the cavity along the force introduction axis; wherein a mounting force acting along a mounting force axis can be applied to the tubular part, for mounting the piezoelectric measuring arrangement in the cavity said tubular part is expandable along the force introduction axis by an applied mounting force; wherein in a cross-sectional plane defined by the force introduction axis and the mounting force axis the tubular part is elliptical in shape having a major semiaxis extending along the mounting force axis and having a minor semiaxis extending along the force introduction axis.

According to the present invention, the tubular part of the WIM force transducer no longer has a circular shape in the cross-sectional plane as taught in Calderara et al. Instead, the tubular part according to the present invention is elliptical in the cross-sectional plane.

The applicant has found that with the same amount of mounting force as in the case of the circular tubular part of Calderara et al applied to a tubular part that is elliptical in the cross-sectional plane and has a greater dimension along the mounting force axis than along the force introduction axis this leads to a greater expansion along the force introduction axis while avoiding plastic expansion of the tubular part.

By way of comparison, the same amount of mounting force essentially causes 30% more vertical expansion of the tubular part. As a result, the manufacturing tolerances for the tubular part according to the invention and the piezoelectric measuring arrangement are less strict which makes their manufacture more cost-effective.

In an advantageous embodiment, the tubular part of the WIM force transducer comprises an outer surface and a center point, said outer surface being formed elliptically away from the center point; and wherein the tubular part comprises at least a mounting area and an inner surface, which mounting area is situated on the mounting force axis; and the inner surface is formed to be concave towards the center point in the mounting area.

In the mounting area where the mounting force can be applied the tubular part is mechanically reinforced in particular areas by means of a specific design. An outer surface is formed elliptically away from the center point, an inner surface is formed to be convex towards the center point. The reason for this is that the mounting force acts locally in the mounting area and deforms the mounting area. The mounting force results in compressive forces on the outer surface and the mounting force results in tensile forces on the inner surface. On the outer surface, the compressive forces act tangentially towards the mounting area. On the inner surface, the tensile forces act tangentially away from the mounting area. The elliptical shape of the outer surface and the concave shape of the inner surface specifically avoid plastic deformation of the mounting area under the impact of the compressive and tensile forces.

The mounting area is reinforced so that an equal amount of mounting force to that applied on the tubular part of Calderara et al produces a proportion of plastic expansion of the tubular part that is essentially 25% smaller. As a consequence, this reinforced mounting area leads to a higher probability that the desired amount of mechanical prestress will be achieved after the mounting force is released which in turn leads to higher measurement repeatability and higher linearity of the force transducer.

In another advantageous embodiment, the mounting area of the tubular part of the WIM force transducer extends on the inner surface between two turning points; and on the inner surface the mounting area comprises a constant concave reinforcement radius.

This has the advantage that an axial expansion of the mounting area along the mounting force axis can be precisely adjusted by a size of the reinforcement radius. Thus, the size of the reinforced mounting area is specifically adjusted to the magnitude of the mounting force. The size of the reinforced mounting area is kept as small as necessary so that a smallest possible proportion of the reaction force to be measured is dissipated over the reinforced mounting area and a largest possible proportion of the reaction force acts onto the piezoelectric measuring arrangement resulting in the highest possible sensitivity of the WIM force transducer.

In another advantageous embodiment, the mounting area of the tubular part of the WIM force transducer extends along a radial axis over a mounting area angle; or the mounting area of the tubular part of the WIM force transducer extends along the force introduction axis over a reinforcement height.

This has the advantage that a radial expansion of a mounting area along the radial axis can be precisely adjusted by a size of the mounting area angle, and that an axial expansion of the mounting area along the force introduction axis can be precisely adjusted by a size of the reinforcement height. This also results in an as small size of the reinforced mounting area as necessary, a smallest possible proportion of the reaction force to be measured that is dissipated over the reinforced mounting area and a largest possible proportion of the reaction force that acts on the piezoelectric measuring arrangement. Together this results in the highest possible sensitivity of the WIM force transducer.

In another advantageous embodiment, the tubular part of the WIM force transducer comprises a plurality of wall areas; which outer surface in the wall areas being shaped elliptically away from the center point, which inner surface in the wall areas being shaped elliptically away from the center point; and the wall areas have a wall thickness, said wall thickness being essentially constant.

In contrast to the teaching of document CN102928005A1, the tubular part of the WIM force transducer comprises several wall areas having a constant wall thickness. This wall thickness is kept as small as necessary so that a smallest possible proportion of the reaction force to be measured is dissipated over the wall areas and the largest possible proportion of the reaction force to be measured reaches the piezoelectric measuring arrangement resulting in in the highest possible sensitivity of the WIM force transducer.

The invention further relates to a housing profile for such WIM force transducer.

Further advantageous solutions for the problems are achieved by the features of the further dependent claims.

BRIEF DESCRIPTION OF THE DRAWINGS

In the following, the invention will be explained in more detail by way of example with reference to the figures in which.

The same parts in the drawings are always denoted with the same reference numerals.

DETAILED DESCRIPTION OF EXEMPLARY EMBODIMENTS OF THE INVENTION

Figure 1:
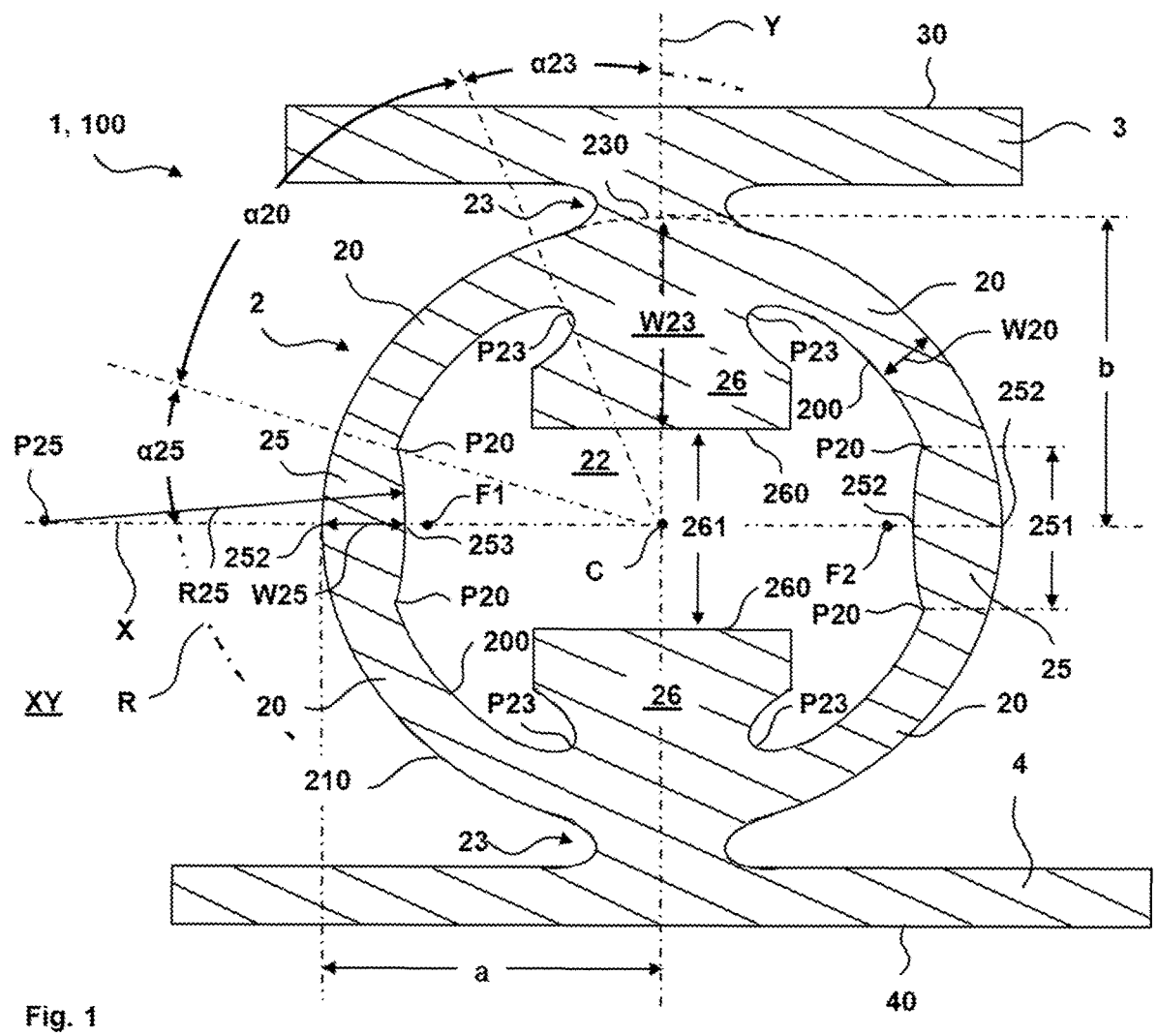
FIG. 1 shows a cross section through a portion of an embodiment of a housing profile of the WIM force transducer according to the invention.

FIG. 1 shows a cross section through a portion of an embodiment of a housing profile 1 of the WIM force transducer 100 according to the invention. Such WIM force transducer 100 is inserted in a roadway and measures a reaction force from a vehicle driving on the roadway when the vehicle crosses over the WIM force transducer. However, it will be apparent to those skilled in the art who become knowledgeable about the present invention, that it is also possible to practice the invention in other force transducers having a housing profile.

A horizontal axis or mounting force axis X and a vertical axis or force introduction axis Y are indicated in FIG. 1. The two axes intersect in a center point C of the force transducer 100. The cross section is shown in a cross-sectional plane XY defined by the mounting force axis X and the force introduction axis Y. A longitudinal axis is not shown, but runs through the center point C in a direction that is normal to the XY plane shown in FIG. 1. Thus, the mounting force axis X, force introduction axis Y and longitudinal axis are perpendicular to each other. The roadway extends in a direction that is parallel to the mounting force axis X.

Housing profile 1 is made of mechanically resistant material such as iron, iron alloys, steel, aluminum, etc. However, housing profile 1 is preferably made of aluminum and preferably is a unitary structure that is manufactured from a single piece of aluminum. A housing profile 1 made of one piece of aluminum can be manufactured in a cost-effective manner and easily transported and installed in a roadway due to its low weight compared to iron, iron alloys, steel, etc. In one exemplary embodiment, housing profile 1 has a width of 35 mm along the mounting force axis X and a height of 35 mm along the force introduction axis Y. Exemplary embodiments of housing profile 1 may have a length of 1000 mm or 2000 mm measured along the longitudinal axis.

Though housing profile 1 desirably is formed as a unitary structure, that structure comprises a tubular part, which is generally designated by the numeral 2 in FIG. 1 and is disposed between a force introduction flange 3 and a force anchoring flange 4 with regard to the force introduction axis Y. A force introduction surface 30 of the force introduction flange 3 resides in a plane that is parallel to the mounting force axis X and ideally situated at a distance of a few centimeters below the roadway surface. A reaction force to be measured by the WIM force transducer 100 is thereby guided from the force introduction surface 30 of the force introduction flange 3 into the tubular part 2 along the force introduction axis Y. Force transducer 100 is mechanically permanently secured in a subsurface of the roadway by means of the force anchoring flange 4. A force anchoring surface 40 of the force anchoring flange 4 is parallel to the mounting force axis X and to the force introduction surface 30.

In the region surrounding the center point C, the tubular part 2 is internally hollow. In the cross-sectional view of FIG. 1, the tubular part 2 encloses a cavity 22 along an elliptical arc r that revolves 360° completely around from the center point C. The elliptical arc r extends in the cross-sectional plane XY. Tubular part 2 is defined in part by an inner surface 200 that faces towards the center point C and delimits the cavity 22. The tubular part 2 is further defined in part by an outer surface 210, that faces in the opposite direction of the center point C from the inner surface 200, and which further delimits the tubular part 2 towards the outside of the cavity 22.

The outer surface 210 is elliptically shaped away from the center point C. The outer surface 210 has a major semiaxis a and a minor semiaxis b. The major semiaxis a coincides with the mounting force axis X, and the minor semiaxis b coincides with the force introduction axis Y. In addition, a first focus F1 of the elliptical outer surface 210 and a second focus F2 of the elliptical outer surface 210 are located on the mounting force axis X.

The major semiaxis a is measured on the mounting force axis X between the center point C and a mounting point 252 on the outer surface 210. The major semiaxis a is for example 12.5 mm long. The minor semiaxis b is measured on the force introduction axis Y between the center point C and a point on a transition line 230 of a transition region 23. The minor semiaxis b is for example 12.0 mm long.

The tubular part 2 comprises different regions 20, 23, 25 that are delimited by an inner surface 200 facing toward the center point C and the interior of the tubular part 2 and delimited by an exterior surface 210 facing away from the center point C toward the exterior of the tubular part 2, and with a thickness of the tubular part 2 in between these two delimiting surfaces. Thus, the tubular part 2 is defined by a plurality of wall regions 20, a plurality of transition regions 23 and a plurality of mounting regions 25. With the different regions 20, 23, 25, the tubular part 2 encloses the cavity 22 along the elliptical arc r completely by 360°. The respective different regions 20, 23, 25 include respective portions of the inner surface 200 and the outer surface 210. Each of the different regions 20, 23, 25 is optimized for a special function.

Preferably, the tubular part 2 comprises four standard wall regions 20 between the force introduction axis Y and the mounting force axis X. The standard wall regions 20 are optimized to have as small of a wall thickness of the tubular part 2 as possible. Because the wall thickness of each standard wall region 20 is as small as possible, only a relatively small proportion of the reaction force to be measured by the force transducer 100 will be transferred to the wall regions 20. Each standard wall region 20 extends along the elliptical arc r over a wall region angle $\alpha 20=50°$. In the standard wall regions 20, the outer surface 210 is shaped essentially elliptically away from the center point C. In the standard wall regions 20, the inner surface 200 is shaped essentially elliptically away from the center point C. For the purposes of the invention, the adverb "essentially" is intended to mean at least 90% complete.

As schematically shown in FIG. 1, each of the standard wall regions 20 has a standard wall thickness W20. The standard wall thickness W20 is measured between a point on the outer surface 210 and a point on the inner surface 200 and is the minimum thickness between any point on the outer surface 210 and the nearest point on the inner surface 200. Preferably, the standard wall thickness W20 is essentially constant. The standard wall thickness W20 is the smallest wall thickness of the tubular part 2. The standard wall thickness W20 is for example 2.0 mm.

The standard wall regions 20 are continuous with the transition regions 23. Furthermore, the standard wall regions 20 are continuous with the mounting regions 25. For the purposes of the present invention, continuous means that the standard wall thicknesses W20 change to the transition wall thicknesses W23 of the transition regions 23 in a continuous and stepless manner as schematically shown in FIG. 1. Similarly, the standard wall thicknesses W20 change to the reinforced wall thicknesses W25 of the mounting regions 25 in a continuous and stepless manner. Such continuous transitions are particularly stable in a mechanical aspect under the action of a mounting force and show no plastic deformation for the amount of the mounting force. On the inner surface 200, each standard wall region 20 extends between a vertex P23 of a transition region 23 and a turning point P20 of a mounting region 25.

Preferably, tubular part 2 comprises two transition regions 23, which transition regions 23 are on the force introduction axis Y. Each transition region 23 extends along the elliptical arc r over a transition region angle $\alpha 23=20°$. The transition regions 23 are optimized for a highest possible force transduction onto the piezoelectric measuring arrangement. With a highest possible force transduction, a relatively high proportion of the reaction force to be measured is transferred to the piezoelectric measuring arrangement.

In a first transition region 23 the tubular part 2 is mechanically connected to the force introduction flange 3. In a second transition region 23 the tubular part 2 is mechanically connected to the force anchoring flange 4. Therefore, the tubular part 2 has no external surface in the transition regions 23. Instead, tubular part 2 has a transition line 230 in the transition regions 23. Transition line 230 is schematically depicted in FIG. 1 as the dashed line continuously extending from the outer surface 210 of the adjacent standard walls 20 and between each opposite side of the force introduction flange 3. Transition line 230 represents a delimitation of the tubular part 2 with respect to the force introduction flange 3. Though not expressly depicted in FIG. 1, a similar transition line represents a delimitation of the tubular part 2 with respect to the force anchoring flange 4. In the transition regions 23, the tubular part 2 is connected to the force introduction flange 3 and the force anchoring flange 4 preferably by material bonding.

The first transition region 23 of the tubular part 2 is mechanically connected to a first mounting member 26 of the tubular part 2. The second transition region 23 is mechanically connected to a second mounting member 26. Preferably, the tubular part 2 comprises two mounting members 26, which mounting members 26 are aligned along the force introduction axis Y. The two mounting members 26 are punch-shaped in cross-section. The two mounting members have identical dimensions in cross-section. Each mounting member 26 is defined in part by a respective inner force introduction surface 260 that faces 26 the other force introduction surface 260 the center point c therebetween. The two inner force introduction surfaces 260 delimit the cavity 22 along the force introduction axis Y. The two inner force introduction surfaces 260 are part of the inner surface 200. Preferably, the inner force introduction surfaces 260 are in a plane parallel to the mounting force axis X. The manufacturing tolerance of the evenness of the inner force introduction surfaces 260 is less strict than the 0.02 mm required for the Calderara et al device. The manufacturing tolerance of the parallelism of the inner force introduction surfaces 260 is less strict than the 0.02 mm required for the Calderara et al device. As schematically shown in FIG. 1, the inner force introduction surfaces 260 are separated from each other by a vertical distance 261 of 5.9 mm, for example, along the force introduction axis Y.

A portion of the inner surface 200 is parabolic in shape in the transition regions 23. As schematically shown in FIG. 1, the inner surface 200 of each transition region 23 has two parabolas, one to either side of the mounting member 26. Each transition region 23 of the inner surface 200 defining a parabola in the XY cross-section of FIG. 1 has a vertex P23.

The transition regions 23 have a transition wall thickness W23. The transition wall thickness W23 is depicted in FIG. 1. The transition wall thickness W23 is measured along the force introduction axis Y between a point on the transition line 230 and a point on the inner force introduction surface 260. The transition wall thickness W23 is the greatest wall thickness of the tubular part 2. The transition wall thickness W23 is 10 mm, for example.

Preferably, the tubular part 2 comprises two mounting regions 25, which mounting regions 25 are on the mounting force axis X. Mounting regions 25 are optimized for specific local mechanical reinforcement of the tubular part 2. As schematically shown in FIG. 1, each mounting region is bisected by the mounting force axis X. Each mounting region 25 preferably comprises a mounting point 252 located on the outer surface 210 and the mounting force axis X. Opposite the mounting point 252 along the mounting force axis X is a reinforcement point 253 located on the inner surface 200. At the mounting point 252, the outer surface 210 is formed elliptically away from the center point C and is concave towards the center point C. At the reinforcement point 253, the inner surface 200 is convex towards the center point C. The elliptical shape of the outer surface 210 and the convex shape of the inner surface 200 specifically avoid plastic deformation of the mounting area under the action of compressive and tensile forces.

Each mounting region 25 of the tubular part 2 extends along the elliptical arc r over a mounting area angle $\alpha 25=20°$. A radial extension of a mounting region 25 along the elliptical arc r is precisely adjustable by a size of the mounting area angle $\alpha 25$. Each mounting region 25 extends between two turning points P20 on the inner surface 200 of the tubular part 2. As schematically shown in FIG. 1, each mounting region 25 extends along the force introduction axis Y over a reinforcement height 251. An axial dimension of a mounting region 25 along the force introduction axis Y is precisely adjustable by the size of the reinforcement height 251. The reinforcement height 251 is 6.0 mm, for example. At the reinforcement point 253, the inner surface 200 preferably has a constant concave reinforcement radius R25, which reinforcement radius R25 is measured from a reference point P25, said reference point P25 being outside the tubular part 2 on the mounting force axis X. An axial dimension of a mounting region 25 along the mounting force axis X is precisely adjustable by the size of the reinforcement radius R25. A reinforcement radius R25 is 16.0 mm, for example.

Mounting regions 25 have a reinforced wall thickness W25. The reinforced wall thickness W25 is depicted schematically in FIG. 1. The reinforced wall thickness W25 is measured on the mounting force axis X between a mounting point 252 on the outer surface 210 and a reinforcement point 253 on the inner surface 200. In the exemplary embodiment shown in FIG. 1, the reinforced wall thickness W25 is 2.5 mm, for example.

Figure 2:
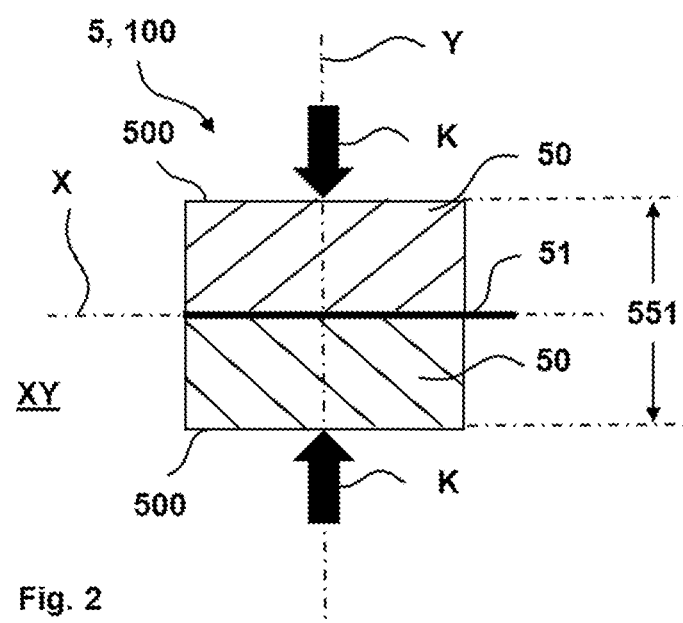
FIG. 2 shows a cross section through a portion of an embodiment of a piezoelectric measuring arrangement of the WIM force transducer according to FIG. 1.

FIG. 2 shows a cross section through a portion of an embodiment of a piezoelectric measuring arrangement 5 of the force transducer 100 according to the invention.

As schematically shown in FIG. 2, the piezoelectric measuring arrangement 5 comprises at least one piezoelectric measuring element 50 and at least one electrode 51. Piezoelectric measuring arrangement 5 has a vertical height 551 of, for example, 6.00 mm along the force introduction axis Y. Piezoelectric measuring arrangement 5 has a width of, for example, 12.0 mm along the mounting force axis X. Piezoelectric measuring arrangement 5 has a length of, for example, 12.0 mm along the longitudinal axis. In the exemplary embodiment schematically shown in FIG. 2, the piezoelectric measuring arrangement 5 has an electrode 51 sandwiched between two piezoelectric measuring elements 50.

Piezoelectric measuring arrangement 5 defines external force introduction surfaces 500 on which the force K to be measured acts along the force introduction axis Y. The force K is schematically represented as black arrow in FIG. 2. Preferably, piezoelectric measuring arrangement 5 comprises two outer force introduction surfaces 500 on which the force K to be measured acts along the force introduction axis Y. Each of the outer force introduction surfaces 500 lies in a plane that is parallel to the mounting force axis X. The manufacturing tolerances such as evenness, parallelism, thickness tolerance, etc. of the outer force introduction surfaces 500 are less strict than those required of the Calderara et al device, thereby enabling more cost-effective production of the present invention. The manufacturing tolerance of the evenness of the outer force introduction surfaces 500 is less strict than the 0.03 mm required for the Calderara et al device. The manufacturing tolerance of the parallelism of the outer force introduction surfaces 500 is less strict than the 0.03 mm required for the Calderara et al device.

The piezoelectric measuring element 50 desirably is disc-shaped and consists of piezoelectric crystal material such as quartz ($SiO_2$ single crystal), calcium gallo-germanate ($Ca_3Ga_2Ge_4O_{14}$ or CGG), langasite ($La_3Ga_5SiO_{14}$ or LGS), tourmaline, gallium orthophosphate, piezoceramics, etc. The piezoelectric measuring element 50 is cut in such a crystallographic orientation that it has a high sensitivity for the force K to be measured. The sensitivity is a measure of how many electric polarization charges are generated for a certain amount of the force K to be measured. Preferably, the piezoelectric measuring element 50 is oriented according to the longitudinal effect so that negative and positive electric polarization charges are generated on those surfaces on which the force K acts along the force introduction axis Y. A number of the electric polarization charges is proportional to the size of the force K. The number of electric polarization charges increases with the square of the size of the surfaces on which the force K acts along the force introduction axis Y. The larger the surfaces are, the higher is the sensitivity of the piezoelectric measuring arrangement 5. However, those skilled in the art knowing the present invention may also use piezoelectric measuring elements with different orientations such as those based on the transverse effect where electric polarization charges are generated on surfaces of the measuring elements that lie in planes that are perpendicular to the surfaces on which the force acts.

The exemplary piezoelectric measuring arrangement 5 according to FIG. 2 preferably comprises two piezoelectric measuring elements 50. As schematically represented by the diagonal lines in opposite orientations, the two piezoelectric measuring elements 50 are arranged with opposite crystallographic orientation relative to one another. As a result of this disposition, surfaces of the two piezoelectric measuring elements 50 on which electric polarization charges with the same polarity are generated are facing one another. Electrode 51 is arranged between these surfaces of the two piezoelectric measuring elements 50 with respect to the force introduction axis Y. Electrode 51 is in direct mechanical contact with these surfaces of the two piezoelectric measuring elements 50. Electrode 51 receives the electric charges with the same polarization from these surfaces of the two piezoelectric measuring elements 50. The tapped electric polarization charges are transmitted as electrical signals via electrical conductors to an evaluation unit where the signals are evaluated. The electrical conductors and the evaluation unit are not shown in the Figures.

The dimensions of the piezoelectric measuring arrangement 5 are optimized to make the surfaces of the piezoelectric measuring elements 50 as large as possible for high sensitivity. Moreover, to enable manufacture in a cost-effective manner, the magnitude of the manufacturing tolerances applicable to parameters such as evenness, parallelism and thickness tolerance of the outerforce introduction surfaces 500 that is permitted, is taken into account and chosen to be less strict.

The dimension of the piezoelectric measuring arrangement 5 along the force introduction axis Y is specifically manufactured with a vertical oversize as compared to the vertical distance 261 within the cavity 22. In the exemplary embodiment shown, the piezoelectric measuring arrangement 5 has a vertical height 551 of 6.00 mm along the force introduction axis Y while for the hollow profile 2 the vertical distance 261 between the inner force introduction surfaces 260 is 5.90 mm along the force introduction axis Y. The difference between the vertical height 551 and the vertical distance 261 is the vertical oversize of the piezoelectric measuring arrangement 5. In this exemplary embodiment, the vertical oversize is 0.10 mm.

Figure 3:
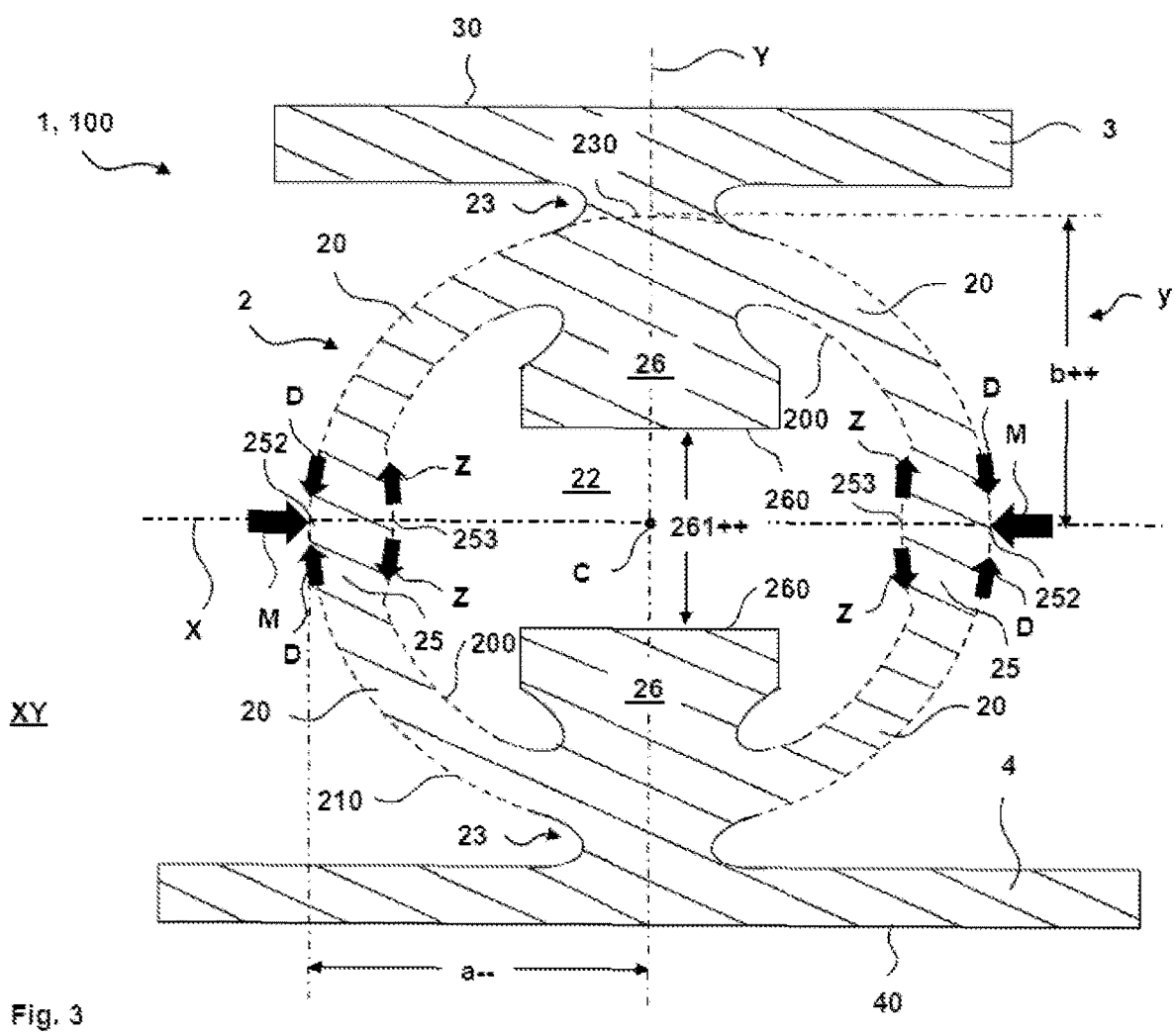
FIG. 3 shows a cross-section through the portion of the housing profile of the WIM force transducer according to FIG. 1 which is expanded by means of a mounting force.
Figure 4:
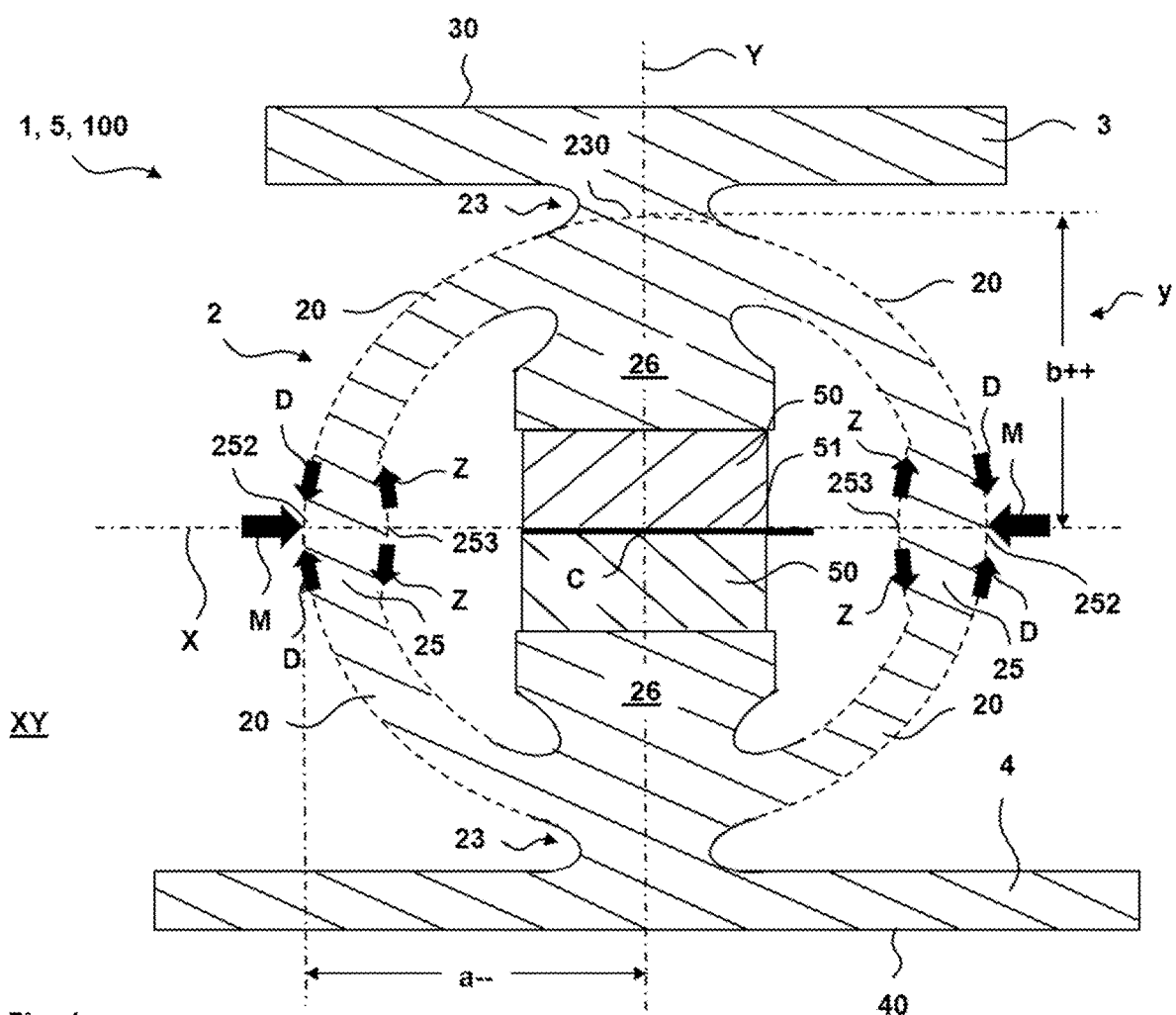
FIG. 4 shows a cross section of the portion of the piezoelectric measuring arrangement of the force transducer according to FIG. 2 after it has been mounted in the expanded housing profile of the WIM force transducer according to FIG. 3.

The piezoelectric measuring arrangement 5 can be mounted in the cavity 22. For mounting the piezoelectric measuring arrangement 5 in the cavity 22 of the tubular part 2, the tubular part 2 is expanded along the force introduction axis Y. This expansion is at least as large as the vertical oversize and the manufacturing tolerances of the tubular part 2 and piezoelectric measuring arrangement 5 along the force introduction axis Y. A mounting force M acting along the mounting force axis X is applied for this purpose of temporarily expanding the vertical distance 261 of the cavity 22, as shown schematically by the black arrows in FIGS. 3 and 4. Preferably, the mounting force M is applied from the outside at the two mounting points 252 from opposite sides of the tubular part 2. The mounting force M is shown schematically as black arrow in FIGS. 3 and 4. Under the action of the mounting force M, the tubular part 2 is compressed in the horizontal direction of the mounting force axis X and is expanded in the vertical direction of the force introduction axis Y. As schematically shown in FIG. 3, the horizontal compression x leads to an elastically compressed major semiaxis a−− of the tubular part 2. At the same time, the vertical expansion y leads to an elastically expanded minor semiaxis b++ of the tubular part 2. The horizontal compression x and vertical expansion y of the tubular part 2 are represented in FIGS. 3 and 4 as dashed inner surface 200 and dashed outer surface 210.

The mounting regions 25 are locally reinforced as compared to the wall regions 20. The reinforced wall thickness W25 of the mounting regions 25 is greater than the wall thickness W20 of the wall regions 20. It is only due to the increased wall thickness W25 of the mounting regions 25 that the compression at the mounting points 252 and reinforcement points 253 is elastic. As shown by black arrows in FIGS. 3 and 4, the mounting force M at the mounting points 252 results in compressive forces D on the outer surface 210 and tensile forces Z at the reinforcement points 253 on the inner surface 200. The compressive forces D act on the outer surface 210 tangentially towards the mounting points 252 and away from the transition regions 23. The tensile forces Z act on the inner surface 200 tangentially away from the reinforcement points 253 and towards the transition regions 23. The result is to effect a pulling apart of the inner force introduction surfaces 260 from each other so as to widen the gap between them.

In the exemplary embodiment, taking into account the manufacturing tolerances regarding evenness and parallelism of the tubular part 2 and the piezoelectric measuring arrangement 5, the tubular part 2 is widened along the force introduction axis Y by a vertical expansion y of 0.15 mm. The expanded vertical distance 261++ between the inner force introduction surfaces 260 of the expanded tubular part 2 is 6.05 mm. Thereafter, the piezoelectric measuring arrangement 5 is inserted in the vertically expanded tubular part 2. Preferably, the piezoelectric measuring arrangement 5 is installed with a vertical height 551 of 6.00 mm between the inner force introduction surfaces 260 of the expanded tubular part 2.

After the piezoelectric measuring arrangement 5 has been inserted between the inner force introduction surfaces 260 of the expanded tubular part 2, then the mounting force M is no longer applied to the tubular part 2. Due to the vertical oversize of 0.10 mm of the cavity 22 along the force introduction axis Y compared to the dimension of the piezoelectric measuring arrangement 5, the horizontal compression and the vertical expansion of the tubular part 2 are partially maintained. As schematically shown FIG. 5, removal of the mounting force leads to deformation of the compressed horizontal expansion a−− to a residually compressed horizontal expansion a− and of the expanded vertical expansion b++ to a residually expanded vertical expansion b+. Thus, a residually expanded vertical expansion b1 of the tubular part 2 of 0.10 mm is maintained.

Figure 5:
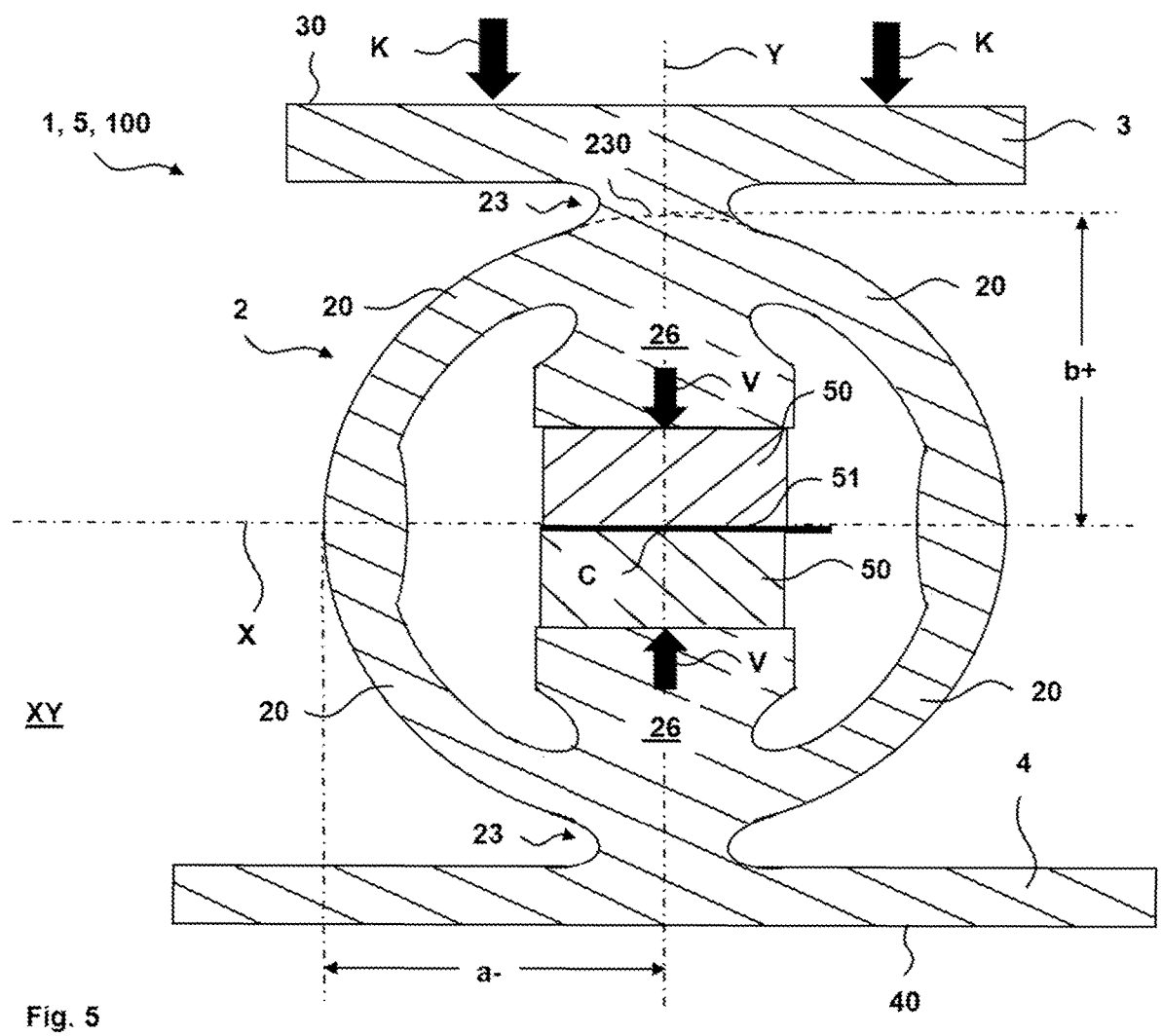
FIG. 5 shows a cross section through the portion of the WIM force transducer according to FIG. 4 after the mounting force has been released.

The residually expanded vertical expansion b+ generates a mechanical prestress V of the piezoelectric measuring arrangement 5 within the tubular part 2. As can be seen in FIG. 5, the mechanical prestress V along the force introduction axis Y causes surfaces of the piezoelectric measuring elements 50 and the electrode 51 to rest on each other in a force-locking manner. Thus, the mechanical prestress V eliminates areas that are not in electrical contact with each other, which otherwise might lead to incomplete charge tapping. Moreover, the mechanical prestress V eliminates any roughness and unevenness of these surfaces, which become sealed. The combination of these positive effects of the mechanical prestress V yields a force transducer 100 with a high degree of measurement repeatability and a high degree of linearity.

However, the material of the tubular part 2 has a material-specific elastic limit, which raises the possible risk that the tubular part 2 may exhibit partial plastic expansion during assembly. After releasing the mounting force M, a tubular part 2 undergoing partial plastic expansion assumes an unpredictable shape so that the mechanical pretension V that prevails is too small to achieve a high degree of measurement repeatability and a high degree of linearity. In addition, if the vertical oversize is too small, then the mechanical prestress V that acts after releasing the mounting force M will be too small anyway a high degree of measurement repeatability and a high degree of linearity. Aluminum that is used as the material for the housing profile 1 in the exemplary embodiment has a particularly low elastic limit in comparison to iron, iron alloys, steel, etc.

The tubular part 2 according to the invention is elliptical in shape. For an elliptical tubular part 2 having a major semiaxis a that is longer than the minor semiaxis b, the mounting force M along the mounting force axis X will generate a larger vertical expansion y along the force introduction axis Y than in the case of the circular tubular part of Calderara et al that has the same circular radius along the mounting force axis and the force introduction axis. For a major semiaxis a that is 5% larger than the minor semiaxis b, the mounting force M preferably generates an expanded vertical expansion y that is essentially 30% greater than for a circular tubular part having the same circular radius along the mounting force axis and the force introduction axis. To achieve a vertical expansion y of 0.15 mm, the elliptical tubular part 2 requires application of a mounting force M that causes a horizontal compression x of 0.12 mm. In contrast, for the circular tubular part according to Calderara et al, the mounting force M must achieve a horizontal compression of 0.15 mm.

The larger vertical expansion y along the force introduction axis Y can be explained by the two geometry-related effects of the tubular part 2 according to the invention. These two geometry-related effects will be explained in more detail below.

Figure 6:
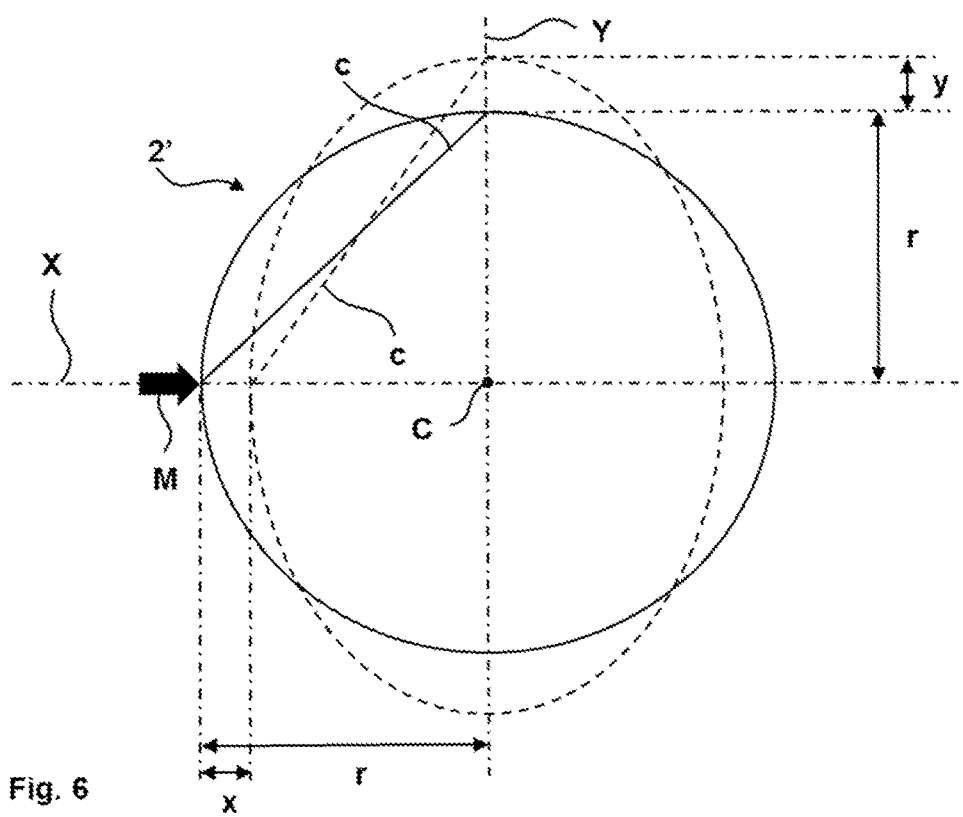
FIG. 6 shows an representation of the compression and expansion of a modeled circular tubular part.
Figure 7:
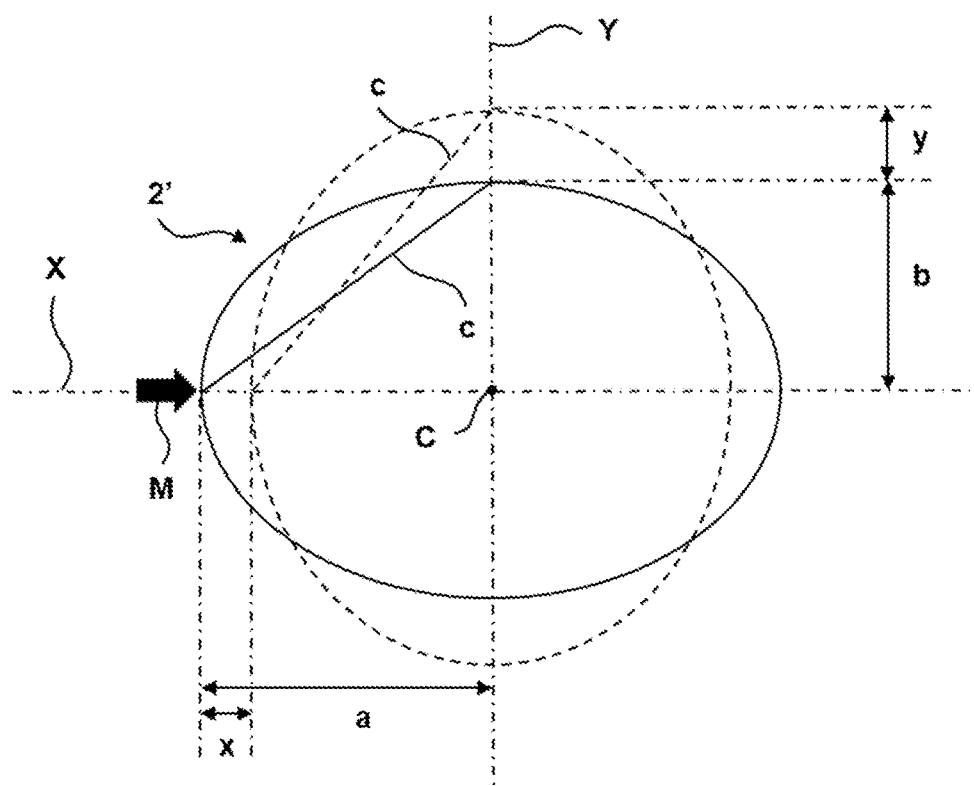
FIG. 7 shows an representation of the compression and expansion of a modeled elliptical tubular part.

In this respect, FIGS. 6 and 7 show two representations of the compression and expansion of a modeled tubular part 2'. FIG. 6 shows the horizontal compression and vertical expansion of a modeled circular tubular part 2' having a circle radius r. FIG. 7 shows the horizontal compression and vertical expansion of a modeled elliptical tubular part 2' having a minor semiaxis b and a major semiaxis a.

Under the impact of the mounting force M acting along the mounting force axis X, the modeled tubular part 2' is expanded along the force introduction axis Y. The vertical expansion of the modeled tubular part 2' is represented by a dashed line.

The vertical expansion y of the modeled circular tubular part 2' according to FIG. 6 results in an expanded ellipse. Along the force introduction axis Y the circle radius r of the expanded ellipse is enlarged by a vertical expansion y, while along the mounting force axis X, the circle radius r of the expanded ellipse is reduced by a horizontal compression x.

The vertical expansion y of the modeled elliptical tubular part 2' according to FIG. 7 results in an expanded ellipse.

The expanded ellipse is represented by a dashed line. Along the force introduction axis Y the minor semiaxis b of the expanded ellipse is enlarged by a vertical expansion y, while along the mounting force axis X the major semiaxis a of the expanded ellipse is reduced by a horizontal compression x.

For a rigid body, when expanded, the length of the hypotenuse c remains unchanged.

For the modeled circular tubular part 2' according to FIG. 6, the mounting force M results in a vertical expansion y which is of the same amount as the horizontal compression x.

However, this is different for the expansion of the modeled elliptical tubular part 2' according to FIG. 7. The Pythagorean Theorem states:

$$c^2 = a^2 + b^2 = (a-x)^2 + (b+y)^2$$

This equation solved for the vertical expansion y gives:

$$y = \sqrt{b^2 + 2ax - x^2} - b$$

For a>b or a=(1+n)b with n being a positive percentage the following applies:

$$y = \sqrt{b^2 + 2(1+n)bx - x^2} - b$$

This equation can be solved for any positive percentage n where an amount of the vertical expansion y is always greater than an amount of the horizontal compression x.

For the elliptical tubular part 2 the major semiaxis a preferably is 5% larger than the minor semiaxis b, which means that n=5%. Furthermore, for a minor semiaxis b=12.0 mm and for a horizontal compression x=1.2% in the case of the elliptical tubular part 2 results a vertical expansion y=1.26% which is essentially 6% larger than in the case of the circular tubular part of Calderara et al.

However, a rigid body has an infinitely high extensional stiffness ε. The elliptical tubular part 2 according to the invention and the circular tubular part according to Calderara et al, however, have a finite extensional stiffness ε since the extensional stiffness ε depends on both the modulus of elasticity E of the tubular part material and the specific geometry of the tubular parts.

The extensional stiffness ε follows from Hook's law. For a cylindrical solid body having a length of l, then a longitudinal expansion Δl/l of the solid body is proportional to a tensile or compressive force K acting onto the solid body. The proportionality factor is the extensional stiffness ε:

$$\varepsilon = \frac{l * M}{\Delta l}$$

When this is applied to the modeled circular tubular part 2' according to FIG. 6, the extensional stiffness $\varepsilon_k$ along the mounting force axis X is the product of the circular radius r and the mounting force M divided by the horizontal compression x. Thus, the extensional stiffness $\varepsilon_k$ of the circular tubular part 2' is:

$$\varepsilon_k = \frac{r * M}{x}$$

Furthermore, for the modeled elliptical tubular part 2' according to FIG. 7 applies accordingly that the extensional stiffness $\varepsilon_e$ along the mounting force axis X is the product of the major semiaxis a and the mounting force M divided by the horizontal compression x. Thus, the extensional stiffness $\varepsilon_e$ of the elliptical tubular part 2' is:

$$\varepsilon_e = \frac{a * M}{x}$$

However, for the elliptical tubular part 2, the major semiaxis a along the mounting force axis X is longer than the minor semiaxis b along the force introduction axis Y, while for the circular tubular part of Calderara et al the circle radius r is the same along the mounting force axis X and along the force introduction axis Y. Yet the elliptical tubular part 2 and the circular tubular part have essentially the same geometry along the force introduction axis Y so that along the force introduction axis Y, the length of the minor semiaxis b is the same as the circle radius r. Preferably, for the elliptical tubular part 2 the major semiaxis b is 5% longer than the minor semiaxis a and, thus, also 5% longer than the circle radius r. Therefore, the extensional stiffness $\varepsilon_e$ of the elliptical tubular part 2 is 5% greater than the extensional stiffness $\varepsilon_k$ of the circular tubular part. A mounting force M of the same amount results in a 5% greater horizontal compression x for the elliptical tubular part 2 as compared to the circular tubular part.

Thus, the elliptical tubular part 2 according to the present invention and the circular tubular part according to Calderara et al differ by two geometry-related effects. The first geometry-related effect is the relatively larger vertical expansion y along the force introduction axis Y of the elliptical tubular part 2. The second geometry-related effect is the relatively greater extensional stiffness $\varepsilon_e$ along the mounting force axis X of the elliptical tubular part 2. These two geometry-related effects act synergistically, and since they occur independently of one another, then the two geometry-related effects are multiplied to achieve an essentially 30% larger vertical expansion y in the case of the elliptical tubular part 2.

LIST OF REFERENCE NUMERALS 1 housing profile
2 tubular part
2' modeled tubular part
3 force introduction flange
4 force anchoring flange
5 piezoelectric measuring arrangement
20 standard wall region
22 cavity
23 transition region
25 mounting region
26 mounting element
30 force introduction surface
40 force anchoring surface
50 piezoelectric measuring element
51 electrode
100 force transducer
200 inner surface
210 outer surface
230 transition line
251 reinforcement height
252 mounting point
253 reinforcement point 260 inner force introduction surface
261 vertical distance
261++ expanded vertical distance
500 outer force introduction surface
551 vertical height
α20 standard wall region angle
α23 transition region angle
α25 mounting region angle
a− residually compressed major semiaxis
a−− compressed major semiaxis
b minor semiaxis
b+ residually expanded minor semiaxis
b++ expanded minor semiaxis
c hypotenuse
C center point
D compressive force
F1 first focus
F2 second focus
n positive percentage
K force
M mounting force
P23 vertex
P20 turning point
P25 reference point
R elliptical arc
R25 reinforcement radius
r circle radius
V mechanical prestress
W20 standard wall thickness
W23 transition wall thickness
W25 reinforced wall thickness
x horizontal compression
X mounting force axis
XY cross-sectional plane
Y force introduction axis
y vertical expansion
Z tensile force

What is claimed is:

1. A Weigh-in-motion force transducer comprising:
a housing profile that defines a tubular part, which defines an interior forming a cavity;
a piezoelectric measuring arrangement that generates electric polarization charges under the impact of a reaction force that acts via the housing profile along a force introduction axis, wherein the piezoelectric measuring arrangement is mounted within the cavity under mechanical prestress along the force introduction axis;
wherein the tubular part is defined by a configuration that expands along the force introduction axis by an applied mounting force that acts on the tubular part along a mounting force axis, wherein the configuration of the tubular part is elliptical in shape in a cross-sectional plane defined by the force introduction axis and the mounting force axis and has a major semiaxis extending along the mounting force axis and a minor semiaxis extending along the force introduction axis, and wherein the major semiaxis is longer than the minor semiaxis.

2. The WIM force transducer according to claim 1, wherein the tubular part has an outer surface and a center point, which outer surface is formed elliptically away from the center point.

3. The WIM force transducer according to claim 2, wherein the tubular part includes a mounting area and an inner surface, which mounting area is on the mounting force axis; and wherein the mounting area and the inner surface is formed to be concave towards the center point.

4. The WIM force transducer according to claim 3, wherein the mounting area extends on the inner surface between a first turning point and a second turning point; and on the inner surface and the mounting area has a constant concave reinforcement radius.

5. The WIM force transducer according to claim 3, wherein the mounting area extends along a radial axis over a mounting area angle.

6. The WIM force transducer according to claim 3, wherein the mounting area extends along the force introduction axis over a reinforcement height.

7. The WIM force transducer according to claim 2, wherein the tubular part has a plurality of wall sections; wherein each wall section has a respective outer surface that is formed elliptically away from the center point, wherein each wall section has a respective inner surface that is formed elliptically away from the center point; and wherein each of the wall sections defines a respective wall thickness that is essentially constant.

8. The WIM force transducer according to claim 7, wherein each respective wall section defines a respective wall thickness; wherein each respective wall thickness in each respective wall section in the mounting area is a reinforced wall thickness; and wherein the thickness of each respective reinforced wall thickness is greater than the thickness of each respective wall thickness that is not reinforced.

9. The WIM force transducer according to claim 7, wherein a mounting area extends on the inner surface between a first turning point and a second turning point; and wherein at the first turning point the mounting area is continuous with a wall section.

10. The WIM force transducer according to claim 1, wherein along the force introduction axis the cavity is defined by a height that is larger by a vertical oversize as compared to the dimensions of the piezoelectric measuring arrangement that is mounted within the cavity.

11. The WIM force transducer according to claim 10, wherein along the force introduction axis the cavity is defined by a height that is delimited by a pair of inner force introduction surfaces; wherein the inner force introduction surfaces have a vertical distance from each other; wherein the piezoelectric measuring arrangement has a vertical height along the force introduction axis; and wherein a difference between the vertical distance and the vertical height is the vertical oversize.

12. The WIM force transducer according to claim 10, wherein the minor semiaxis is configured for an expansion to an expanded minor semiaxis along the force introduction axis for mounting the piezoelectric measuring arrangement in the cavity; which expansion is at least as large as the vertical oversize and manufacturing tolerances of the tubular part and the piezoelectric measuring arrangement along the force introduction axis.

13. The WIM force transducer according to claim 1, wherein the tubular part is configured with an expanded minor semiaxis for accommodating the piezoelectric measuring arrangement mounted in the cavity.

14. The WIM force transducer according to claim 13, wherein along the force introduction axis the cavity is defined by a height that is larger by a vertical oversize as compared to the dimensions of the piezoelectric measuring arrangement that is mounted within the cavity; wherein the expanded minor semiaxis with the mounted piezoelectric measuring arrangement can be deformed to a residually expanded minor semiaxis having an expansion that is of the same amount as the vertical oversize and manufacturing tolerances of the tubular part and the piezoelectric measuring arrangement along the force introduction axis.

15. The WM force transducer according to claim 14, wherein the tubular part is configured so that the expanded minor semiaxis with the mounted piezoelectric measuring arrangement can be deformed to the residually expanded minor semiaxis by releasing a mounting force acting along a force introduction axis; and wherein the tubular part is configured so that the residually expanded minor semiaxis generates the mechanical prestress.

16. A housing profile for a Weigh-in-motion force transducer, comprising:
- a housing profile that defines a tubular part, which defines an interior forming a cavity;
- a piezoelectric measuring arrangement that generates electric polarization charges under the impact of a reaction force that acts via the housing profile along a force introduction axis, wherein the piezoelectric measuring arrangement is mounted within the cavity under mechanical prestress along the force introduction axis;
- wherein the tubular part is defined by a configuration that expands along the force introduction axis by an applied mounting force that acts on the tubular part along a mounting force axis, wherein the configuration of the tubular part is elliptical in shape in a cross-sectional plane defined by the force introduction axis and the mounting force axis and has a major semiaxis extending along the mounting force axis and a minor semiaxis extending along the force introduction axis; and
- wherein the major semiaxis is at least 5% larger than the minor semiaxis.

* * * * *